(12) United States Patent
Gonda et al.

(10) Patent No.: US 12,459,580 B2
(45) Date of Patent: Nov. 4, 2025

(54) REINFORCING STRUCTURE FOR A REAR AXLE SUPPORT OF A MOTOR VEHICLE

(71) Applicant: Bayerische Motoren Werke Aktiengesellschaft, Munich (DE)

(72) Inventors: Mihaly Gonda, Unterschleissheim (DE); Lorenz Kriegler, Rottenegg (DE); Tatjana Schoierer, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 313 days.

(21) Appl. No.: 17/922,434

(22) PCT Filed: Jul. 26, 2021

(86) PCT No.: PCT/EP2021/070791
§ 371 (c)(1),
(2) Date: Oct. 31, 2022

(87) PCT Pub. No.: WO2022/023237
PCT Pub. Date: Feb. 3, 2022

(65) Prior Publication Data
US 2023/0192196 A1    Jun. 22, 2023

(30) Foreign Application Priority Data
Jul. 29, 2020  (DE) ............ 10 2020 119 946.5

(51) Int. Cl.
*B62D 25/20*    (2006.01)
*B62D 21/11*    (2006.01)

(52) U.S. Cl.
CPC .......... *B62D 25/2027* (2013.01); *B62D 21/11* (2013.01)

(58) Field of Classification Search
CPC . B62D 21/11; B62D 25/2027; B60G 2204/15
See application file for complete search history.

(56) References Cited

U.S. PATENT DOCUMENTS

| | | | |
|---|---|---|---|
| 6,120,060 A * | 9/2000 | Kocer ................ | B62D 21/11 280/124.109 |
| 6,623,020 B1 * | 9/2003 | Satou ................ | B62D 21/11 280/124.109 |

(Continued)

FOREIGN PATENT DOCUMENTS

| CN | 104903180 A | 9/2015 |
|---|---|---|
| CN | 105365893 A | 3/2016 |

(Continued)

OTHER PUBLICATIONS

Machine translation of DE 102019203095 A1. (Year: 2020).*

(Continued)

*Primary Examiner* — Daniel J Colilla
(74) *Attorney, Agent, or Firm* — Crowell & Moring LLP

(57) ABSTRACT

A reinforcing structure is provided for an underbody of a motor vehicle. The motor vehicle has an axle support, in particular a rear axle support, wherein the axle support has a first and a second holder, which are spaced apart from one another in the transverse direction of the vehicle. The reinforcing structure has a transverse connecting strut and a first and a second axle support linkage. The transverse connecting strut is connected to both the first and the second axle support linkage, and the first holder of the axle support can be connected to the first axle support linkage and the second holder of the axle support can be connected to the second axle support linkage.

9 Claims, 1 Drawing Sheet

(56) References Cited

U.S. PATENT DOCUMENTS

| | | | | |
|---|---|---|---|---|
| 2014/0361582 A1* | 12/2014 | Franzke | ............ | B62D 21/11 228/101 |
| 2015/0021115 A1* | 1/2015 | Komiya | ............ | B62D 21/11 180/312 |
| 2015/0353136 A1* | 12/2015 | Kramer | ............ | B62D 21/11 29/469 |
| 2016/0052553 A1 | 2/2016 | Joest et al. | | |
| 2016/0332668 A1 | 11/2016 | Pienkohs et al. | | |
| 2018/0079452 A1 | 3/2018 | Kramer et al. | | |
| 2019/0111975 A1* | 4/2019 | Hata | ............ | B32B 15/012 |
| 2019/0135100 A1 | 5/2019 | Lange et al. | | |
| 2021/0139078 A1* | 5/2021 | Peru | ............ | B60K 15/063 |

FOREIGN PATENT DOCUMENTS

| | | | | |
|---|---|---|---|---|
| CN | 105829195 A | 8/2016 | | |
| CN | 107074284 A | 8/2017 | | |
| CN | 107438553 A | 12/2017 | | |
| CN | 109415096 A | 3/2019 | | |
| DE | 101 04 040 A1 | 8/2002 | | |
| DE | 19922800 B4 * | 5/2009 | ............ | B62D 21/11 |
| DE | 10 2009 035 158 A1 | 2/2011 | | |
| DE | 10 2009 058 400 A1 | 6/2011 | | |
| DE | 10 2011 100 325 A1 | 11/2012 | | |
| DE | 10 2013 007 005 B3 | 7/2014 | | |
| DE | 10 2014 206 203 A1 | 10/2015 | | |
| DE | 10 2014 115 051 A1 | 4/2016 | | |
| DE | 10 2015 004 465 A1 | 10/2016 | | |
| DE | 102016203173 A1 * | 8/2017 | ............ | B62D 25/20 |
| DE | 102016221032 A1 * | 4/2018 | ............ | B62D 21/11 |
| DE | 10 2017 123 112 A1 | 4/2019 | | |
| DE | 10 2018 125 705 A1 | 4/2020 | | |
| DE | 10 2019 100 879 B3 | 6/2020 | | |
| DE | 10 2019 101 377 A1 | 7/2020 | | |
| DE | 10 2019 203 095 A1 | 9/2020 | | |
| EP | 1 228 949 A2 | 8/2002 | | |
| EP | 1937498 B1 * | 3/2009 | ............ | B60G 3/20 |
| EP | 1712450 B1 * | 12/2009 | ............ | B62D 21/11 |
| EP | 3 113 011 A2 | 1/2017 | | |
| EP | 3 118 086 A1 | 1/2017 | | |
| FR | 2957849 A1 * | 9/2011 | ............ | B60G 21/051 |
| JP | 2009126514 A * | 6/2009 | ............ | B62D 21/11 |
| JP | 2009-190684 A | 8/2009 | | |
| KR | 101813949 B1 * | 1/2018 | ............ | B62D 21/11 |
| WO | WO 2013/178359 A1 | 12/2013 | | |
| WO | WO 2015/132078 A1 | 9/2015 | | |

OTHER PUBLICATIONS

International Search Report (PCT/ISA/210) issued in PCT Application No. PCT/EP2021/070791 dated Oct. 1, 2021 with English translation (four (4) pages).

German-language Written Opinion (PCT/ISA/237) issued in PCT Application No. PCT/EP2021/070791 dated Oct. 1, 2021 (five (5) pages).

German-language Search Report issued in German Application No. 10 2020 119 946.5 dated Jun. 10, 2021 with partial English translation (11 pages).

Cover page of EP 3 114 011 A1 published Jan. 11, 2017 (one (1) page).

Chinese-language Office Action issued in Chinese Application No. 202180032085.X dated Dec. 12, 2024 (11 pages).

English translation of Chinese-language Office Action issued in Chinese Application No. 202180032085.X dated Apr. 11, 2025 (9 pages).

* cited by examiner

REINFORCING STRUCTURE FOR A REAR AXLE SUPPORT OF A MOTOR VEHICLE

BACKGROUND AND SUMMARY

The present invention relates to a reinforcing structure for an underbody of a motor vehicle. In addition, the invention relates to a motor vehicle, in particular an automobile, comprising a reinforcing structure of this kind.

Vehicles which have a reinforcing structure for an underbody of a vehicle are known from the prior art. Particularly in the case of vehicles with a panoramic sunroof and cabriolets, torsion struts are fitted in the region of the rear underbody, in order to compensate for functional disadvantages caused by this body design. These torsion struts forming the reinforcing structure are usually attached to lateral sills in a front region of the motor vehicle and connected to the body centrally at an axle support or at a trunk insert via a strut trestle in a rear region of the motor vehicle. For example, EP 3 114 011 A1 discloses a reinforcing structure of this kind of a vehicle in the form of a shear panel.

In the case of vehicles with an electric drive, a high-voltage battery and an electric drivetrain are needed. Integrating the high-voltage battery and the electric drivetrain into a floor assembly designed for internal combustion engines gives rise to a big increase in stiffness between a middle region of an underbody and a rear region of the underbody in a longitudinal direction of the vehicle. In addition, installation space for the electric drivetrain in the form of a large concavity must be provided in the underbody and this has a detrimental effect on the functioning of the shear panel described above.

Further disadvantages of the prior art, apart from the increase in stiffness, include the fact that the two aforementioned changes in the underbody of electric vehicles, i.e. the integration of the high-voltage battery and the concavity, cause a deterioration in driving dynamics and vehicle acoustics.

The problem addressed by the invention is therefore that of providing a device which is designed, among other things, to overcome the disadvantages from the prior art, as described above.

This problem is solved according to the invention by the features of the independent claims. Advantageous embodiments are specified in the dependent claims.

According to these, the problem is solved by a reinforcing structure for an underbody of a motor vehicle. The motor vehicle has an axle support, in particular a rear axle support. The axle support has a first and a second axle support holder which are spaced apart from one another in a transverse direction of the vehicle. The reinforcing structure has a transverse connecting strut and a first and a second axle support linkage.

The reinforcing structure is characterized in that the transverse connecting strut is connected both to the first and to the second axle support linkage. Furthermore, the first axle support holder can be connected to the first axle support linkage and the second axle support holder to the second axle support linkage.

An axle support in this case can be taken to mean a support that can be connected to a body of the vehicle and which extends substantially in the transverse direction of the vehicle. The axle support may, in particular, be connected to the body via rubber bearings. Wheel suspensions of the motor vehicle, among other things, can be connected to the axle support.

A transverse connecting strut in this case can be taken to mean a strut, in particular a metal strut configured as a pipe, which extends substantially in the transverse direction of the vehicle.

Since the transverse connecting strut is connected to the first and second axle support linkage, a transverse connection can be produced between the first and the second axle support holder through a connection of the first axle support holder to the first axle support linkage and the second axle support holder to the second axle support linkage.

This results in an increase in the transverse stiffness of the motor vehicle. This increase in transverse stiffness means that greater acoustic insulation and therefore also improved vehicle acoustics can be achieved.

The reinforcing structure may, in addition, have a first and a second supporting strut, each of which can run towards the back in the longitudinal direction of the vehicle. The first support strut may be connected to the first axle support linkage and the second support strut may be connected to the second axle support linkage. The reinforcing structure may have a first and a second body linkage which may be configured, in each case, to connect the reinforcing structure to a body of the motor vehicle. In this case, the first body linkage may be spaced apart from the first axle support linkage in the longitudinal direction of the vehicle and be connected to the first support strut. The second body linkage may be spaced apart from the second axle support linkage in the longitudinal direction of the vehicle and be connected to the second support strut.

A support strut in this case can be taken to mean a strut, in particular a metal strut configured as a pipe.

The fact that the first support strut can be connected to the first axle support linkage and the first body linkage means that when the first axle support linkage is connected to the first axle support holder and the first body linkage is connected to the body, the first axle support linkage in the longitudinal direction of the vehicle can be supported. The same applies to a connection of the second support strut, the second axle support linkage, the second body linkage, the second axle support holder, and the body.

The transverse connection that can be produced by the transverse connecting struts and the support that can be produced by the support struts in the longitudinal direction of the vehicle, in particular towards the back, means that an increase in stiffness between a center region of an underbody and a rear part of the underbody, which results from an integration of a high-voltage battery in the underbody, for example, can be compensated for. The driving dynamics of the motor vehicle can thereby be improved.

In addition, the reinforcing structure may have a shear panel connected to the transverse connecting strut, and also a first and a second diagonal strut. The first diagonal strut may be connected to the first body linkage and also to the shear panel. The second diagonal strut may be connected to the second body linkage and the shear panel.

A shear panel in this case can be taken to mean a reinforcing element in the form of a reinforced piece of sheet metal.

A diagonal strut in this case can be taken to mean a strut, in particular a metal strut configured as a pipe.

The shear panel may have a linkage for a torsion strut. The torsion strut may be connectable at the linkage via one, in particular two, screw connection(s) to the shear panel. The linkage may be framed, in particular by a U-shaped profile.

A torsion strut in this case can be taken to mean a strut which is installed in and/or on the underbody of the motor vehicle, runs diagonally between the longitudinal direction of the vehicle and the transverse direction of the vehicle and is used to increase the torsional stiffness of the body of the vehicle.

A U-shaped profile in this case can be taken to mean a metal profile, in particular, which has a substantially U-shape in cross section.

A closed profile, which may exhibit the stiffness necessary for the linkage of the torsion strut, can be formed by the frame of the screw connection with the U-shaped profile along with the shear panel.

The reinforcing structure may have further, in particular two further, body linkages. The further body linkages may each be designed to connect the reinforcing structure to the body of the motor vehicle.

The first body linkage, the second body linkage, the further body linkages, the first axle support linkage and/or the second axle support linkage may each be configured as a pipe section, in particular with a separate baseplate connected to the pipe section.

The connection between the pipe section and baseplate may, in particular, be a welded connection. One advantage of a separate connection of the pipe section and baseplate is that tolerances can be set in the vertical direction of the vehicle.

The reinforcing structure may have a plastic cover. The plastic cover may be connected to the shear panel in such a manner that an air gap is formed between the plastic cover and the shear panel.

The air gap allows there to be ventilation between the plastic cover and the shear panel. In this way, prolonged dampness between the metal shear panel and the plastic cover can be prevented, thereby protecting against corrosion.

The plastic cover can also be provided in such a manner that it covers the remaining reinforcing structure at least partially, so that the smallest possible drag coefficient is thereby achieved.

The shear panel may have corrugations for impact protection. Corrugations in this case can be taken to mean channel-shaped depressions in a sheet-metal component which can be used for reinforcing, among other things, and thereby to prevent deformation of the shear panel.

The reinforcing structure may be coated using high-temperature galvanizing (HTG).

High-temperature galvanizing in this case can be taken to mean a method for coating metal components, in which metal components are dipped in liquid molten zinc, among other things. The molten zinc in this case may have a temperature of over 530° C. This coating is used to protect against corrosion.

The invention further relates to a motor vehicle. The motor vehicle may be a passenger vehicle. The motor vehicle comprises the reinforcing structure described above.

The motor vehicle may have an axle support, in particular a rear axle support. The axle support may have a first and a second axle support holder, which may be spaced apart from one another in the transverse direction of the vehicle. The reinforcing structure may have a transverse connecting strut and a first and a second axle support linkage. The transverse connecting strut may be connected both to the first and to the second axle support linkage. The first axle support holder may be connected to the first axle support linkage and the second axle support holder may be connected to the second axle support linkage.

Furthermore, what is described above in relation to the reinforcing structure also applies similarly to the motor vehicle, and vice versa.

The motor vehicle may have an energy store, in particular for electrical energy, in and/or on an underbody of the motor vehicle. The motor vehicle may be an electric and/or hybrid vehicle.

An embodiment is described below with reference to FIGS. 1 and 2.

DETAILED DESCRIPTION OF THE DRAWINGS

Figure 1:
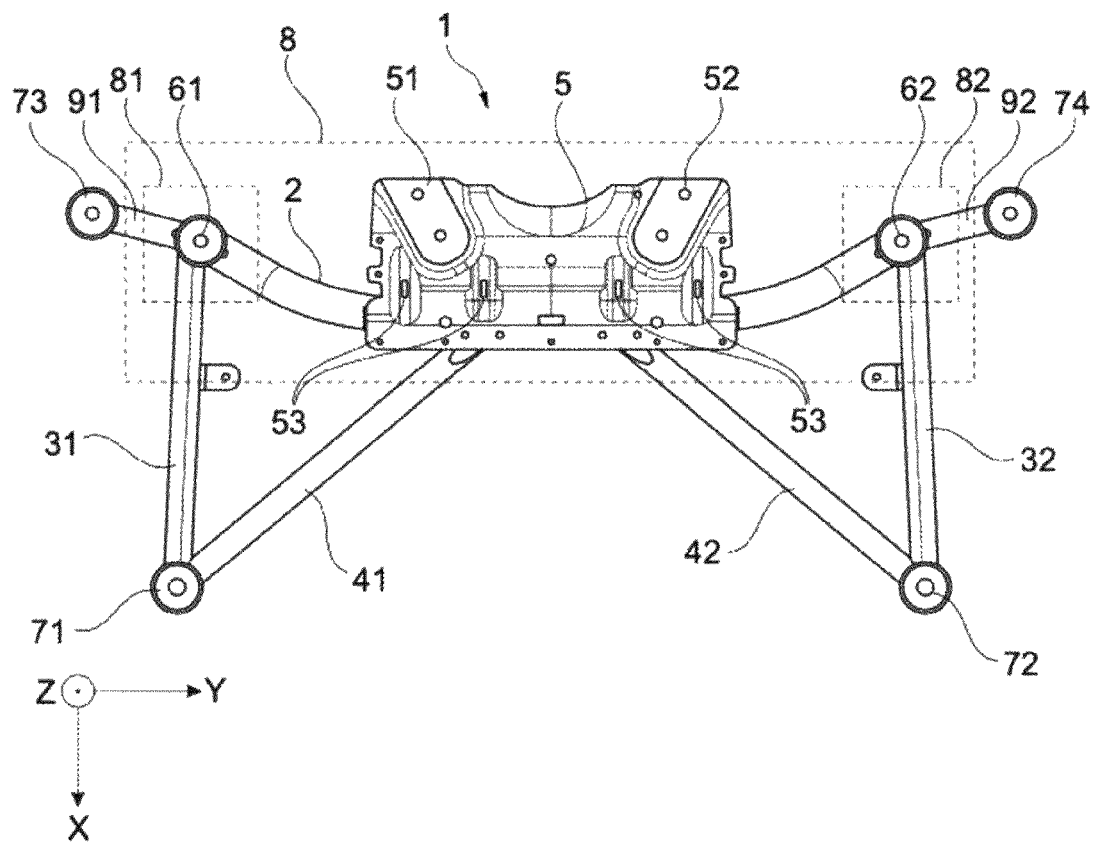
FIG. 1 shows schematically a reinforcing structure of an underbody of a motor vehicle according to an embodiment of the invention.

FIG. 1 is a depiction of a reinforcing structure 1 of an underbody of a motor vehicle.

Furthermore, a Cartesian coordinate system is shown, wherein X is the longitudinal direction of the vehicle, Y is the transverse direction of the vehicle, and Z is the vertical direction of the vehicle. The direction of the arrow in the longitudinal direction of the vehicle X runs from a front of the motor vehicle to a rear of the motor vehicle, i.e. against a main driving direction.

FIG. 1 indicates schematically a rear axle support 8. The rear axle support 8 comprises a first and a second axle support holder 81, 82, which are likewise indicated schematically.

The reinforcing structure 1 comprises a transverse connecting strut 2, two support struts 31, 32, two diagonal struts 41, 42, a shear panel 5, two axle support linkages 61, 62, four body linkages 71, 72, 73, 74 and two connection struts 91, 92.

The shear panel 5 is connected to the transverse connecting strut 2. The shear panel 5 comprises two linkages 51, 52 for one end in each case in the longitudinal direction of a torsion strut not shown in FIG. 1 and four corrugations 53. The torsion struts may each be connected to a body of the motor vehicle at their other end in the longitudinal direction, which is not connected to the shear panel 5.

To be more precise, the shear panel 5 is configured in such a manner that one torsion strut of the two torsion struts in each case can be connected to the linkage 51 or to the linkage 52 via two screw connections in each case. The linkages 51, 52 are each framed by a U-shaped profile (not shown). The corrugations 53 are used for impact protection.

The transverse connecting strut 2 is connected to the rear axle support 8 of the motor vehicle. For this purpose, the stiffening structure 1 has the first and the second axle support linkage 61, 62, which are each connected to the transverse connecting strut 2.

The rear axle support 8, as described above, has the first and the second axle support holder 81, 82, which are spaced apart from one another in the transverse direction of the vehicle Y and connected to the first and the second axle support linkage 61, 62. To be more precise, the first axle support holder 81 is connected to the first axle support linkage 61 and the second axle support holder 82 is connected to the second axle support linkage 62.

Furthermore, the first support strut 31 is connected to the first axle support linkage 61 and the second support strut 32 is connected to the second axle support linkage 62.

The four body linkages 71, 72, 73, 74 are provided in order to connect the reinforcing structure 1 to the body of the motor vehicle.

In this case, a first of the four body linkages 71 is spaced apart from the first axle support linkage 61 in the longitudinal direction of the vehicle X and connected to the first support strut 31. The same applies to a second of the four body linkages 72, which is spaced apart from the second axle support linkage 62 in the longitudinal direction of the vehicle X and is connected to the second support strut 32. The other two body linkages 73, 74 are arranged in the longitudinal direction of the vehicle X substantially at the same height as the two axle support linkages 61, 62.

The first diagonal strut 41 is connected both to the first body linkage 71 and to the shear panel 5. The same applies to the second diagonal strut 42, which is connected both to the second body linkage 72 and to the shear panel 5.

The first connecting strut 91 is connected to the first axle support linkage 61. A third of the four body linkages 73 is spaced apart from the first axle support linkage 61 in the transverse direction of the vehicle Y and to the first connecting strut 91. The same applies to the second connecting strut 92, which is connected to the second axle support linkage 62. A fourth of the four body linkages 74 is spaced apart from the second axle support linkage 62 in the transverse direction of the vehicle Y and connected to the second connection strut 92.

As can be inferred from FIG. 1, the reinforcing structure 1 therefore has an axially symmetrical design in respect of an axis running parallel to the longitudinal direction of the vehicle X.

Figure 2:
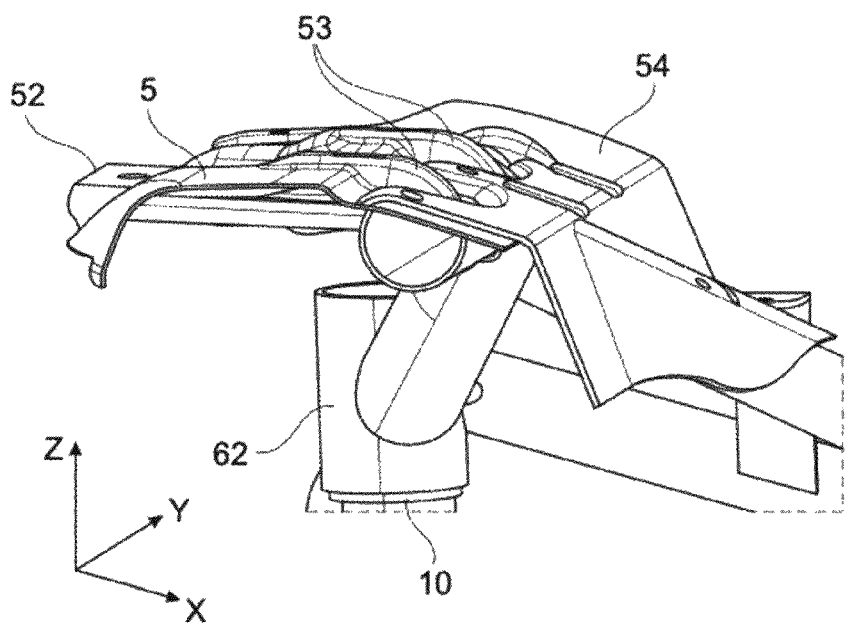
FIG. 2 shows schematically a partial sectional view of the reinforcing structure shown in FIG. 1.

FIG. 2 is a schematic partial sectional view of the reinforcing structure 1.

The detail of the shear panel 5 shown in FIG. 2 corresponds to a part of the shear panel 5 shown in FIG. 1. Furthermore, the second axle support linkage 62 is shown in FIG. 2.

The reinforcing structure 1 comprises a plastic cover 54 and the second axle support linkage 62 comprises a baseplate 10.

The plastic cover 54 is connected to the shear panel 5 in such a manner that an air gap is formed between the plastic cover 54 and the shear panel 5.

The baseplate 10 is connected to the second axle support linkage 62. The connection may be a welded connection. In the same way, a baseplate 10 is connected to each of the first axle support linkage 61, and the first, the second, the third and the fourth body linkage 71, 72, 73, 74 (not shown).

The embodiment of the reinforcing structure 1 described above produces a transverse connection between the first axle support holder 81 and the second axle support holder 82 through a connection of the first axle support holder 81 to the first axle support linkage 61, and also a connection of the second axle support holder 82 to the second axle support linkage 62.

Furthermore, the axle support holder 81 is supported in the longitudinal direction of the vehicle X by the connection between the first body linkage 71 and the body with the help of the first support strut 31. The axle support holder 82 is supported in the longitudinal direction of the vehicle X by the connection between the second body linkage 72 and the body with the help of the second support strut 32. In other words, the two support struts 31, 32 support the reinforcing structure 1 in the longitudinal direction of the vehicle X.

The disadvantages of the prior art described above, in particular the deterioration in driving dynamics and vehicle acoustics which occur when a high-voltage battery and an electric drivetrain are integrated in a floor assembly designed for internal combustion engines, are compensated for by the reinforcing structure 1 described above, in particular by the support thereof in the longitudinal direction of the vehicle X and the transverse connecting strut 2.

LIST OF REFERENCE SIGNS 1 reinforcing structure
2 transverse connecting strut
31 first support strut
32 second support strut
41 first diagonal strut
42 second diagonal strut
5 shear panel
51, 52 linkage for torsion strut
53 corrugations
54 plastic cover
61 first axle support linkage
62 second axle support linkage
71 first body linkage
72 second body linkage
73 third body linkage
74 fourth body linkage
8 rear axle support
81 first axle support holder
82 second axle support holder
91 first connection strut
92 second connection strut
10 baseplate

The invention claimed is:

1. A structure for an underbody of a motor vehicle having a rear axle support with a first and a second axle holder which are spaced apart from one another in a transverse direction of the vehicle, the structure comprising:
    a reinforcing structure, which is different from the rear axle support, the reinforcing structure comprising:
    a transverse connecting strut; and
    a first and a second axle support linkage, wherein
    the transverse connecting strut is connected both to the first and to the second axle support linkage, and
    the first axle support linkage is configured to connect to the first axle holder of the rear axle support and the second axle support linkage is configured to connect to the second axle holder of the rear axle support.

2. The structure according to claim 1, wherein the reinforcing structure further comprises:
    a first and a second support strut, each of which runs towards a rear in a longitudinal direction of the vehicle, wherein
    the first support strut is connected to the first axle support linkage and the second support strut is connected to the second axle support linkage;
    a first and a second body linkage which are configured, in each case, to connect the reinforcing structure to a body of the motor vehicle, wherein
    the first body linkage is spaced apart from the first axle support linkage in the longitudinal direction of the vehicle and is connected to the first support strut, and
    the second body linkage is spaced apart from the second axle support linkage in the longitudinal direction of the vehicle and is connected to the second support strut.

3. The structure according to claim 2, wherein the reinforcing structure further comprises:
    two further body linkages, which are each designed to connect the reinforcing structure to the body of the motor vehicle, wherein
    the first body linkage, the second body linkage, the two further body linkages, the first axle support linkage and/or the second axle support linkage are configured as a pipe section with a separate baseplate connected to the pipe section.

4. The structure according to claim 2, wherein the reinforcing structure further comprises:
   a first and a second diagonal strut;
   a shear panel connected to the transverse connecting strut and also to the first and the second diagonal strut,
      wherein the first diagonal strut is connected to the first body linkage and also to the shear panel, and
      wherein the second diagonal strut is connected to the second body linkage and the shear panel.

5. The structure according to claim 4, wherein
   the shear panel has a linkage for a torsion strut,
   wherein the torsion strut is connectable at the linkage via screw connection(s) to the shear panel, and
   wherein the linkage is framed by a U-shaped profile.

6. The structure according to claim 4, further comprising:
   a plastic cover which is connected to the shear panel such that an air gap is formed between the plastic cover and the shear panel.

7. The structure according to claim 4, wherein
   the shear panel has corrugations for impact protection.

8. The structure according to claim 4, wherein
   the reinforcing structure has a high-temperature galvanized coating.

9. A motor vehicle, comprising:
   a rear axle support, wherein the rear axle support has a first and a second axle holder, which are spaced apart from one another in a transverse direction of the vehicle; and
   a reinforcing structure, different from the rear axle support, comprising a transverse connecting strut and a first and a second axle support linkage, wherein
   the transverse connecting strut is connected both to the first and to the second axle support linkage, and
   the first axle support linkage is configured to connect to the first axle holder of the rear axle support and the second axle support linkage is configured to connect to the second axle holder of the rear axle support.

* * * * *